UNITED STATES PATENT OFFICE.

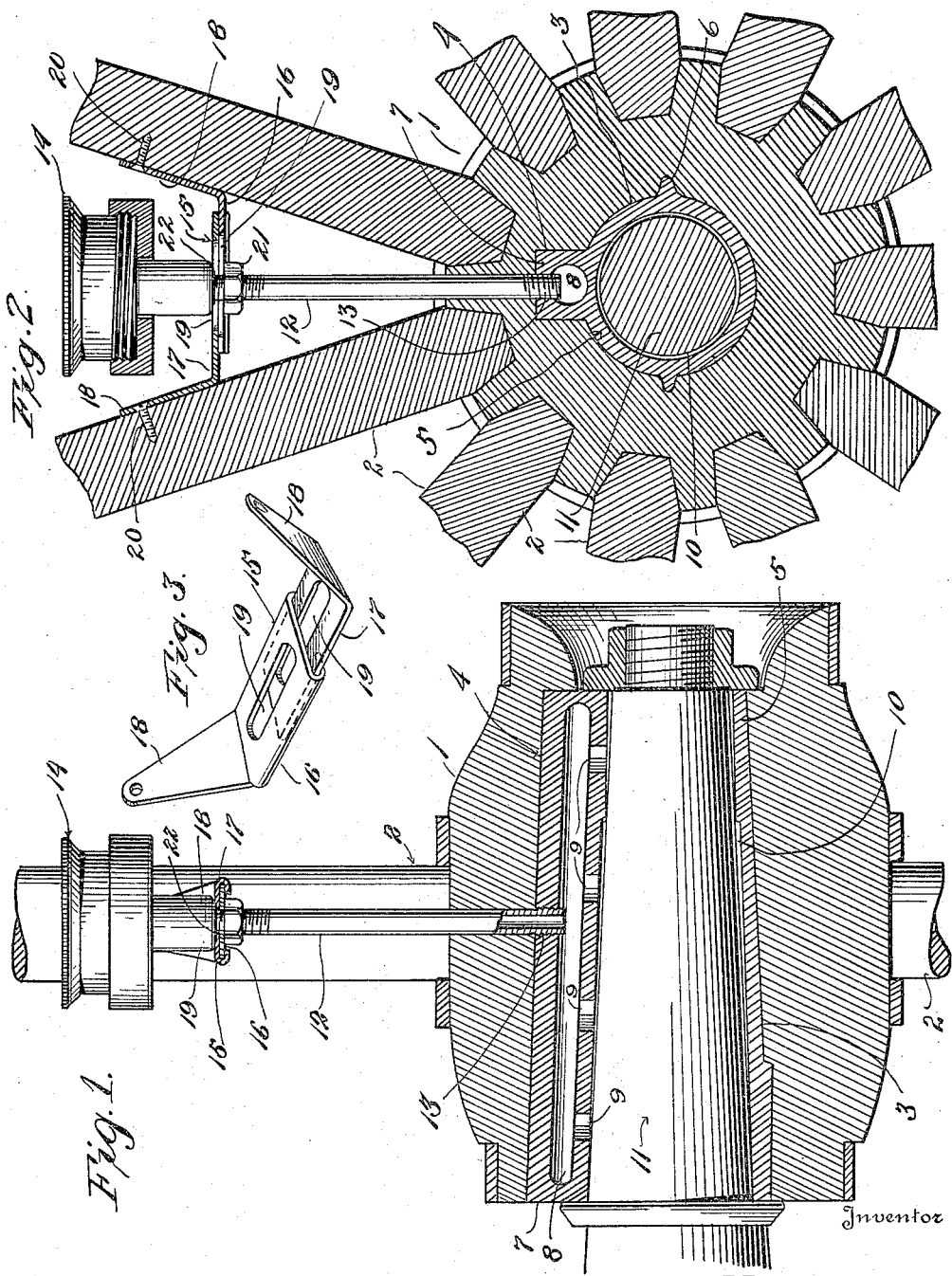

ANDREW J. WESTMORELAND, OF RICHMOND, VIRGINIA, ASSIGNOR OF ONE-HALF TO CHARLES A. BRIDGES, OF RICHMOND, VIRGINIA.

OILING DEVICE FOR AN AXLE-SPINDLE.

1,149,104. Specification of Letters Patent. Patented Aug. 3, 1915.

Application filed January 19, 1915. Serial No. 3,167.

*To all whom it may concern:*

Be it known that I, ANDREW J. WESTMORELAND, a citizen of the United States, residing at Richmond, in the county of Henrico, State of Virginia, have invented certain new and useful Improvements in an Oiling Device for an Axle-Spindle; and I do hereby declare the following to be a full, clear, and exact description of the invention, such as will enable others skilled in the art to which it appertains to make and use the same.

This invention relates to an oiling device for an axle spindle.

An object of the invention resides in the provision of a device of this character whereby the spindle will be oiled throughout its entire length.

A further object of the invention resides in the provision of a device of this character which may be used on wheels where the distances between the spokes are various.

A still further object of the invention resides in so constructing the device that the surface of the spindle bearing which contacts with the spindle will be entirely smooth and free from projections.

With these and other objects in view, such as will appear as the description progresses, my invention comprises the combination and arrangement of parts as set forth in and falling within the scope of the appended claims.

Referring to the drawing: Figure 1 is a longitudinal sectional view of my device in position on a portion of a wheel, the hub being shown in section and a portion of the device itself in elevation. Fig. 2 is a transverse sectional view partly in elevation. Fig. 3 is a perspective view of the cup supporting bracket.

Referring to the drawing wherein like parts are indicated by like characters throughout the several views:—in the drawings I have shown a hub 1 with a plurality of spokes 2 radiating therefrom. This hub is provided with the usual hole 3 extending therethrough and in communication with this hole I contemplate providing a channel 4 for a purpose which will later appear.

Mounted in the hole 3 is a spindle bearing 5 which is prevented from rotation in the said hole by lips 6 engaging slots in the hub. Cast integrally with this bearing 5 on the upper side thereof is a hollow rib 7 having a chamber 8 therein and passageways 9 which communicate with the chamber and with the hole 10 of the bearing. This rib 7 is located in the channel 4 and the chamber 8 therein is adapted to contain hard oil or grease which will be fed through the passageways 9 onto the spindle 11. In order that this chamber 8 may be supplied with hard oil or grease I have provided a pipe 12 which extends through the hub 1, is in screw threaded engagement, as at 13, with the rib 7 and has communication with the chamber 8. This pipe 12 extends outwardly from the hub between two of the spokes 2 and has a grease cup 14 secured to the upper end thereof. This cup is preferably of the force feed type so that when the cap thereof is screwed inwardly toward the hub 1 the grease or hard oil will be forced through the pipe 12 into the chamber 8.

In order that the pipe 12 and the cup 14 may be supported I have provided a bracket 15 which has two telescoping sections 16 and 17 and angularly extending ears 18. These sections 16 and 17 are provided with registering slots 19 through which the pipe 12 passes. When the bracket 15 is put in place the ears 18 bear against the faces of the two adjacent spokes and are secured thereto by suitable fasteners 20. After the bracket has been secured to the spokes in this manner and the pipe 12 extended through the slots 19 and into the chamber 8 of the rib 7 the pipe 12 is prevented from turning and unscrewing and the bracket 15 held in its adjusted position by a nut 21 which is in threaded engagement with the pipe 12 and is provided for the purpose of causing the bracket 15 to bear against the shoulder 22 of the grease cup.

By locating the rib 7 in which the chamber 8 is formed externally and so that it extends longitudinally of the spindle bearing the bearing surface is free from all projections and the spindle is oiled throughout its length.

By making the bracket which supports the grease cup and pipe adjustable the device may be used on wheels of various sizes where the distance between the spokes varies.

From the foregoing description it will be seen that I have provided an oiling device for axle spindles and I have so constructed the device that it may be applied readily to wheels of various sizes.

While I have illustrated and described a particular embodiment of my invention, I have merely done so for the sake of convenience and I do not wish to be limited to that particular embodiment as it is obvious that numerous changes may be made within the details of construction thereof without in any way departing from the spirit of the invention or exceeding the scope of the appended claims.

What I claim is:—

1. In an oiling device for an axle spindle, a bearing member for said spindle, provided with a rib having a chamber therein for containing a lubricant and having also means for conveying the lubricant to the spindle at a plurality of points, a pipe connected to and extending outwardly from said rib, a grease cup on the outer end of said pipe, an adjustable bracket for supporting said pipe and cup, means for supporting said bracket, and means for binding the said bracket against the grease cup.

2. In an oiling device for an axle spindle, a bearing for the said spindle, including means for containing a lubricant, the said bearing being adapted to be located in the hub of a wheel, a pipe connected to the lubricant container and extending upwardly through the hub between two spokes of the wheel, a bracket consisting of two telescopically arranged sections for supporting said pipe arranged to be secured to two adjacent spokes, a grease cup on the upper end of the pipe and means for binding the bracket against the grease cup.

In testimony whereof, I affix my signature, in the presence of two witnesses.

ANDREW J. WESTMORELAND.

Witnesses:
   Geo. H. Chandlee,
   Henry E. Cooper.

Copies of this patent may be obtained for five cents each, by addressing the "Commissioner of Patents, Washington, D. C."